United States Patent
Wenckel

(10) Patent No.: US 7,891,099 B2
(45) Date of Patent: Feb. 22, 2011

(54) DAMPED GUIDING UNIT AND PORTABLE IMPLEMENT

(75) Inventor: Matthias Wenckel, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 12/437,316

(22) Filed: May 7, 2009

(65) Prior Publication Data

US 2009/0277142 A1 Nov. 12, 2009

(30) Foreign Application Priority Data

May 9, 2008 (DE) .................. 20 2008 006 395 U

(51) Int. Cl.
*B26B 7/00* (2006.01)
*A01D 34/00* (2006.01)

(52) U.S. Cl. .......................... 30/276; 56/12.7
(58) Field of Classification Search .............. 56/1, 56/12.7, 12.1, 255; 30/276, 296.1, 298, 298.4, 30/295, 312; 172/40–42
See application file for complete search history.

(56) References Cited

U.S. PATENT DOCUMENTS

| 4,179,805 | A | * | 12/1979 | Yamada | 30/122 |
| 5,265,341 | A | * | 11/1993 | Kikuchi | 30/276 |
| 5,661,960 | A | * | 9/1997 | Smith et al. | 56/12.7 |
| 7,543,725 | B2 | * | 6/2009 | Herzog | 224/576 |

FOREIGN PATENT DOCUMENTS

| DE | 1757940 A | 8/1971 |
| DE | 10034437 A1 | 1/2002 |
| DE | 10132951 A1 | 1/2002 |
| EP | 1530890 A1 | 5/2005 |
| JP | 09233928 A | 9/1997 |

OTHER PUBLICATIONS

German Patent and Trademark Office, Search Report on Application No. 20 2008 006 395.7, Nov. 26, 2009, 5 pages, Munich, Germany.

* cited by examiner

*Primary Examiner*—Robert E Pezzuto
(74) *Attorney, Agent, or Firm*—Kelly Lowry & Kelley, LLP

(57) ABSTRACT

A damped guiding unit for a portable implement includes a connection element arranged at one end of a guide rod element, for connection of a tool element for the sawing, cutting and/or scything of undergrowth or of grass. A damping element is arranged on the connection element for the damping of oscillations or vibrations caused by the tool element. A holding element is arranged on the guide rod element for holding the portable implement. The holding element and the connection element are structural elements which are respectively separated from each other in that the holding element is associated with a first assembly and the connection element is associated with a further assembly separated from the first assembly. The holding element is further arranged at a distance from the connection element between the one end and the other end of the guide rod element, so that both a direct guiding of the portable implement and also an intensive vibration damping of the holding element is achieved.

15 Claims, 5 Drawing Sheets

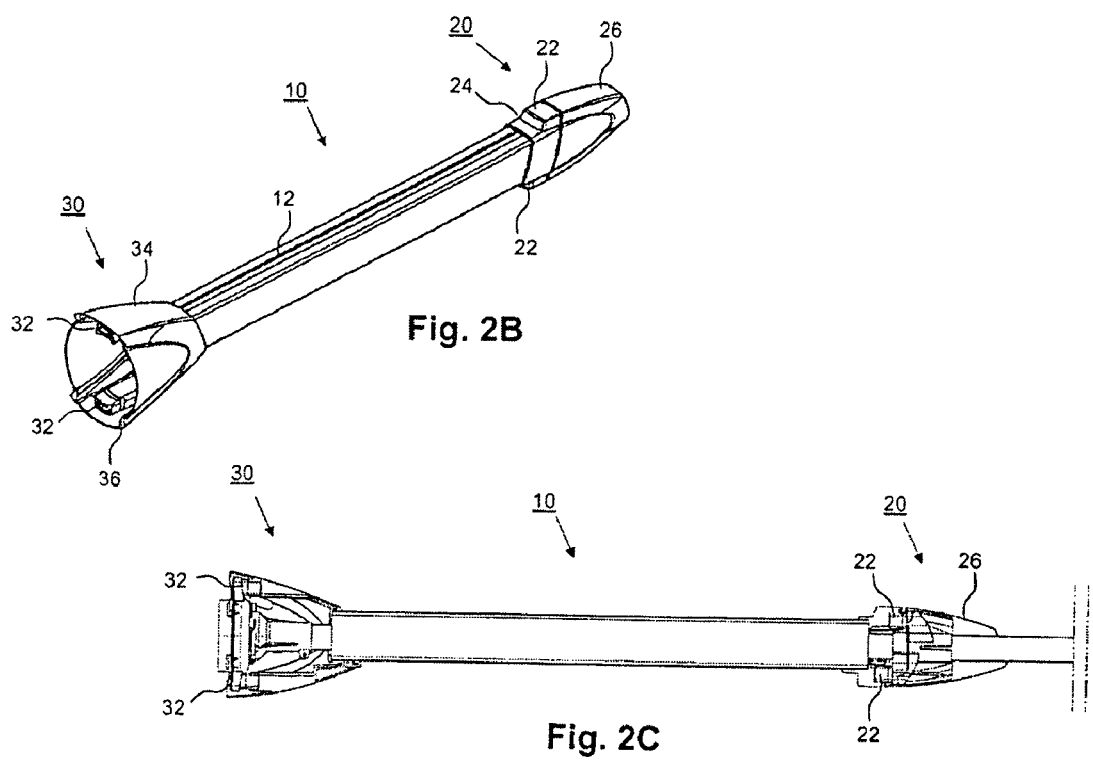

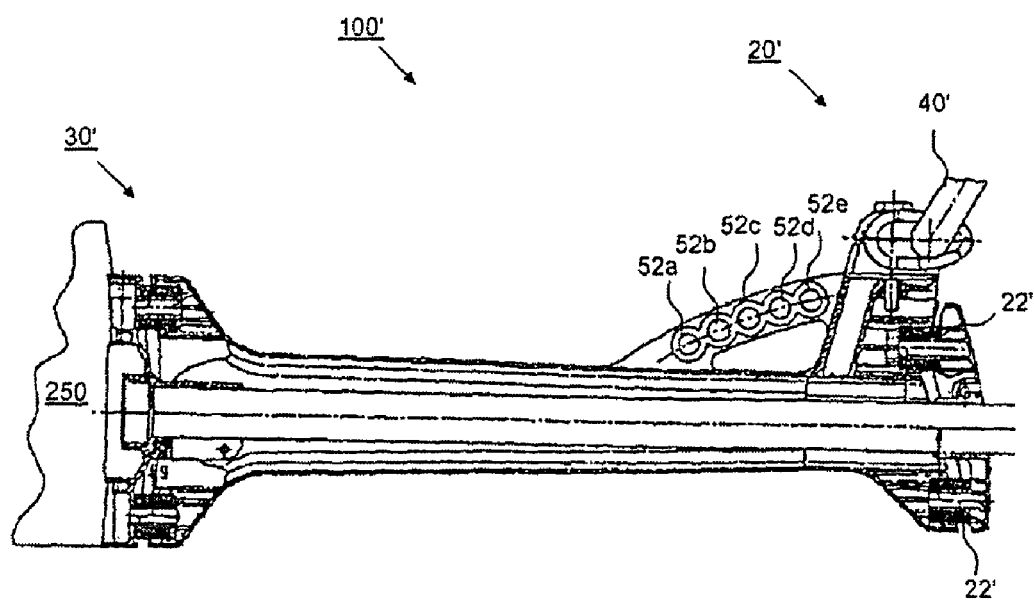
Fig. 4 (prior art = Stand der Technik)

DAMPED GUIDING UNIT AND PORTABLE IMPLEMENT

TECHNICAL FIELD

The present invention relates to a damped guide unit according to the introductory clause of Claim 1 and also a portable, in particular a hand-operated, implement according to the introductory clause of Claim 8.

PRIOR ART

A portable or hand-operated implement of the type mentioned in the introduction is known for example from the publication DE 195 02 171 C2. This known portable implement has a damped guiding unit fastened on the motor side, namely a holding—of grip element 40' connected with the motor via vibration dampers 22' 32' (cf. FIG. 4). The front or first vibration damper 22' of this known damped guiding unit is held in a front or first connection element 20', facing the tool element, and the rear or further vibration damper 32' is held in a rear or further connection element 30' facing the motor.

According to the prior art, the holding element 40' is always fastened on the first or front connection element 20' and is securely installed in the immediate vicinity of the first or front damping element 22' (cf. FIG. 4). According to the prior art, the holding element 40' and the connection element 20' therefore form with the damping element 22' a common component or an assembly which belongs together.

Here, in all known damped guiding units, the problem occurs that the design of the damping elements is always a balancing act between vibration damping and the ability to be guided of the hand-operated implement. Thus, the damping elements 22', 32', generally elastomers or springs, must be designed to be as soft as possible, so that vibrations caused by the motor or by the tool element can be damped as well as possible. In order, however, to achieve a good guiding behaviour of the portable implement, a particularly hard design of the damping elements 22', 32' would be advantageous.

These opposing requirements, namely direct guidance behaviour on the one hand and an intensive uncoupling of the holding element from the motor or from the tool element to achieve an optimum damping on the other hand, can only be brought together according to the prior art by a compromise. The so-called lagging of the shaft with respect to the holding element is felt to be particularly unpleasant in the known damped guiding units.

PRESENTATION OF THE INVENTION: OBJECT, SOLUTION, ADVANTAGES

Proceeding from the disadvantages and shortcomings set forth above, and taking into account the outlined prior art, the present invention is based on the problem of further developing a damped guiding unit of the type mentioned in the introduction and also a portable implement of the type mentioned in the introduction, so that forces and moments which occur, in particular oscillations or vibrations, are introduced in a more optimum manner via the damping element into the holding element, in particular that both a direct guiding of the portable implement and also an intensive vibration damping of the holding element is achieved.

This problem is solved by a damped guiding unit having the features indicated in Claim 1, and by a portable implement having the features indicated in Claim 8. Advantageous embodiments and expedient further developments of the present invention are characterized in the respective subclaims.

Proceeding from the problem, discussed in the Prior Art section, of the advantages and disadvantages of a soft damping or of a hard damping, it is proposed as a technical innovation to place the damping out of the articulation point of the holding element, for example of the grip tube or of a bridge cross-piece for the fitting of a sling strap. In particular, it is proposed to arrange the damping element at a distance from the holding element and therefore to shift the damping forwards or towards the end of the guide rod element, associated with the damped guiding unit, facing the tool element. In this way, forces and moments are introduced in an ergonomically more optimum manner via the damping element into the holding element.

According to the invention, the damping is placed out of the articulation point of the holding element, by the holding element and the connection element being constructed respectively as separate components or components separated from each other. In particular, the holding element is associated with a first assembly and the connection element is associated with a further assembly which is separated from the first assembly. Here, the first assembly has for example the holding element, at least one gas grip for operating the implement and/or at least one connecting element for connecting the holding element with the guide rod and/or at least one operating element for operating the connecting element and/or at least one arresting and/or detent element for fixing the connecting element on the guide rod and/or at least one clamping connection for connecting the holding element with the connecting element and/or at least one opening for fitting a sling strap. The further assembly has in particular the connection element and the at least one damping element.

Due to this structural separation of holding element and connection element, in the present invention the holding element and the connection element, having the damping element, are arranged at a distance from each other. Here, according to an advantageous embodiment of the present invention, the distance between the holding element and connection element, in particular between the centre of the holding element, for instance the centre of a grip element or grip tube, and the centre of the damping element, is more than 40 millimeters (mm) and can be up to the maximum possible length of the guide rod element. Preferably, the distance between the holding element and the connection element is approximately 70 mm to approximately 300 mm. According to the prior art, in which the holding element and the connection element are associated with one and the same component or are arranged on one and the same assembly, the distance between the holding element and the connection element, on the contrary, is only approximately 20 mm to approximately 40 mm.

For connecting a motor for driving the tool element, the damped guiding unit can have at least one further connection element arranged at the other end of the guide rod element.

In addition, the damped guiding unit for the damping of oscillations or vibrations caused for example by the motor can have at least one further damping element. This further damping element can be arranged for example on the further connection element. In order to achieve a best possible result between vibration damping and guidability of the portable implement, in accordance with a particularly advantageous embodiment of the present invention, the two receiving points, or the first and the further damping element, have as great a distance from each other as possible.

According to an advantageous embodiment of the invention, the distance of the first damping element to the motor or to the further damping element is selected as a function of the total length of the guide rod of the implement. This guide rod has the guide rod element, associated with the damped guiding unit, and if applicable at least one shaft tube, connected for example with the tool element. For example, the distance of the first damping element to the further damping element and/or to the motor can be approximately one third to approximately half of the total length of the guide rod.

In addition, according to a particularly advantageous embodiment of the invention, not only do the two receiving points or damping elements have as great a distance as possible from each other, but also the holding element itself is arranged at the greatest possible distance from the damping elements. For example, the holding element can be arranged substantially centrally between the first and the further damping element, and thus have as great a distance as possible from the respective damping elements.

The present invention furthermore relates to a principle for the production of a damped guiding unit for the damping of oscillations and/or of vibrations at least of a holding element, in particular of a grip element, of a portable implement, in particular of a trimmer or a brushcutter. Here, the holding element is arranged on at least one guide rod element associated with the damped guiding unit.

For the direct or indirect connection at least of a tool element for the sawing and/or cutting and/or scything for example of undergrowth and/or of grass, in addition on one end of the guide rod element at least one, in particular first, connection element is arranged.

Furthermore, for the damping of oscillations or vibrations caused by the tool element and/or the motor on the connection element at least one, in particular first, damping element is arranged.

So that the damped guiding unit makes possible both a direct guidance of the portable implement and also an intensive vibration damping of the holding element, the holding element and the connection element are respectively arranged as components spaced or separated from each other on the guide rod element. In particular, the holding element is arranged in connection with a first assembly and the connection element in connection with a further assembly, separated from the first assembly, on the guide rod element. Therefore, according to the present invention, the holding element is arranged at a distance from the connection element between one end and the other end of the guide rod element. This distance between holding element and connection element, in particular between the centre of the holding element, for instance the centre of a grip element or grip tube, and the centre of the damping element, is expediently more than 40 millimeters (mm), preferably approximately 70 mm to approximately 300 mm. Here, the holding element can be arranged for example substantially centrally between the one end and the other end of the guide rod element.

Advantageously, the holding element can be arranged displaceably on the guide rod element, so that the distance of the holding element to the damping element is variable. In particular, the holding element can be connected with the guide rod element such that
- in a first position it is connected with the guide rod element displaceably in longitudinal direction to the guide rod element and
- in a second position it is fixed releasably on the guide rod element, in particular is connected in a force-fitting and/or form-fitting manner with the guide rod element.

The present invention finally relates to the use at least of a damped guiding unit, produced in particular by the principle according to the type set forth above according to the type set forth above and/or at least of a portable implement according to the type set forth above for the ergonomic sawing and/or cutting and/or scything for example of undergrowth and/or of grass.

BRIEF DESCRIPTION OF THE DRAWINGS

As already discussed above, there are various possibilities for advantageously forming and further developing the teaching of the present invention. For this, on the one hand reference is to be made to the claims respectively following Claim 1 and Claim 8 and also Claim 11, and on the other hand further developments, features and advantages of the present invention are described in further detail below with the aid of the illustrated example embodiment, showing in perspective illustration FIG. 1 in side view an example embodiment of a damped guiding unit with vibration damping according to the present invention, which is produced by the principle according to the present invention;

FIG. 2B a further perspective view of the vibration damping of FIG. 1;

FIG. 2C a side view of the vibration damping of FIG. 1;

FIG. 4 a damped guiding unit according to the prior art (cf. publication DE 195 02 171 C2).

Identical or similar developments, elements or features are given identical reference numbers in FIGS. 1 to 4.

BEST WAY TO CARRY OUT THE INVENTION

Figure 1:
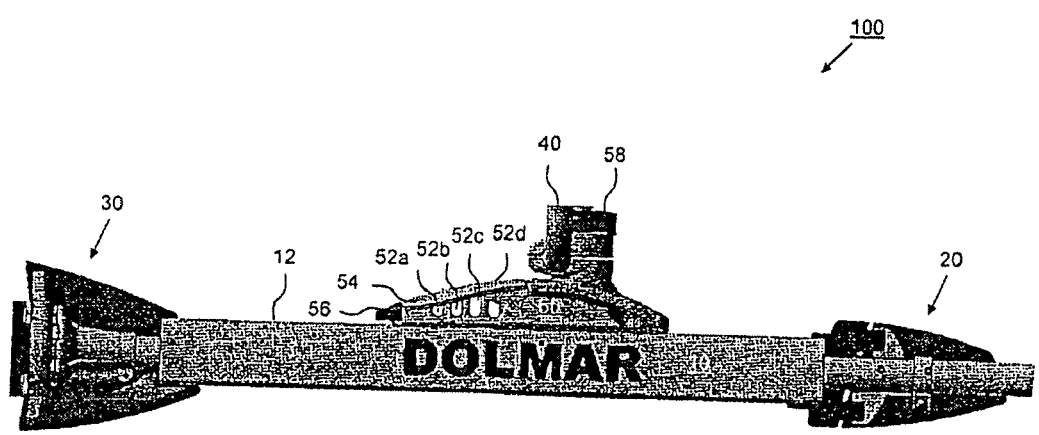
Figure 3:
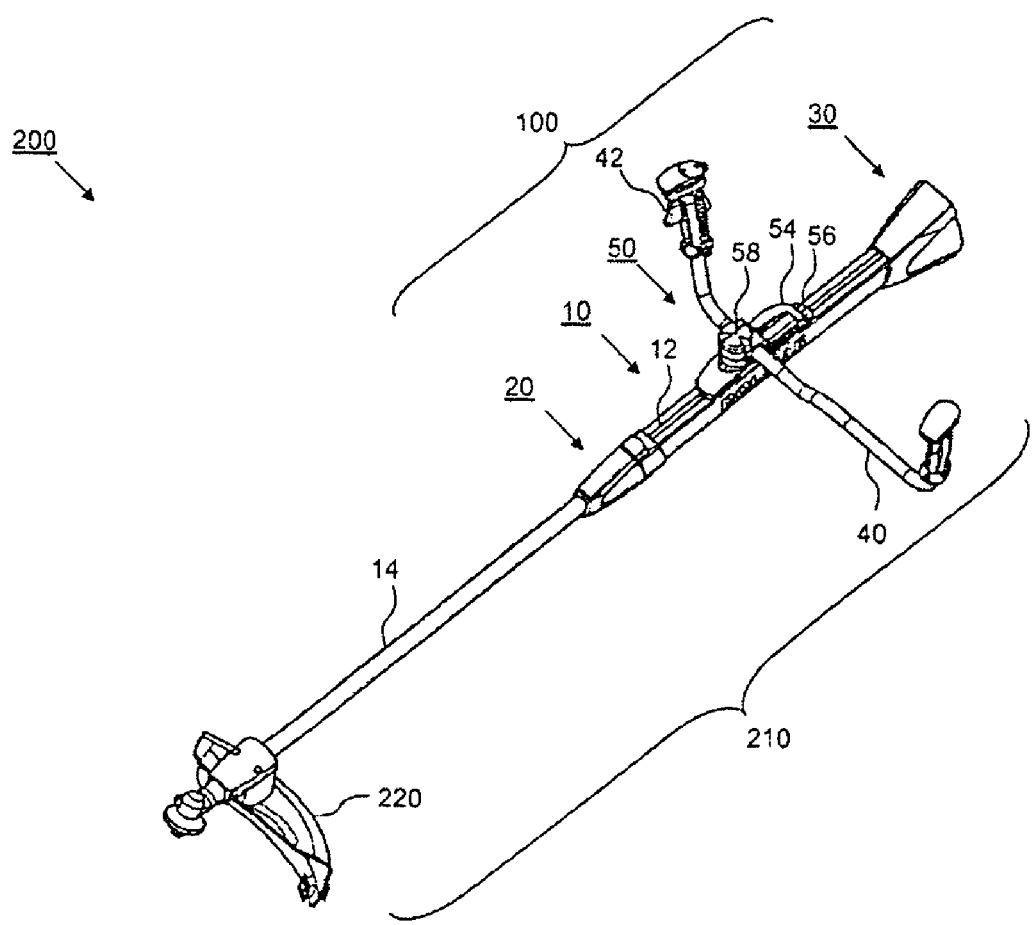
FIG. 3 in perspective view an example embodiment of a portable implement according to the present invention with the damped guiding unit of FIG. 1.

FIG. 1 shows a damped guiding unit 100, in particular a holding element damping system, namely a grip damper, for a portable implement 200, namely for a trimmer or a brushcutter (cf. FIG. 3).

This damped guiding unit 100 contains a vibration damping (cf. FIGS. 2A to 2B) with
- a guide rod element 10,
- a first or front connection element 20, arranged on one end of the guide rod element 10, for the direct or indirect connection at least of a tool element 220 (cf. FIG. 3) for the sawing and/or cutting and/or scything for example of undergrowth and/or of grass and
- a further connection element 30, arranged at the other end of the guide rod element 10, for the direct or indirect connection at least of a motor 250 for driving the tool element 220.

Figure 2A:
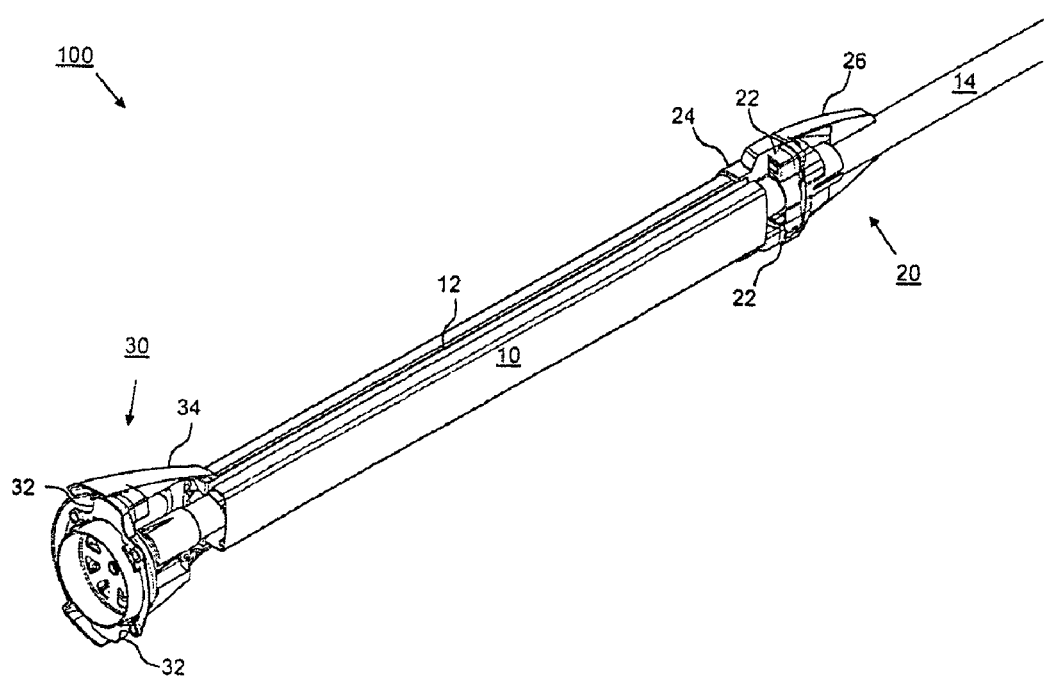
FIG. 2A a perspective view of the vibration damping of FIG. 1.

For the damping of oscillations or vibrations caused by the motor 250 and/or the tool element 220, at least a first damping element 22, for example at least a first elastomer or at least a first spring, is arranged on the front connection element 20. As illustrated in FIGS. 2A to 2C, in the present example embodiment two damping elements 22 are arranged on the front connection element 20. The first or front damping elements 22 or damping elements 22 facing the tool element 220 are covered in FIGS. 1, 2B and 3 respectively by a damping covering and are therefore not directly visible.

In addition, as illustrated in FIGS. 2A to 2C, for the damping of oscillations or vibrations caused by the motor 250 and/or the tool element 220, for example on the further connection element 30 at least a further damping element 32 for instance at least a further elastomer or at least a further spring can be arranged.

As illustrated in FIGS. 1 and 3, the damped guiding unit 100 additionally has a holding element 40, arranged on the guide rod element 10, namely a grip element or a grip tube, for holding, in particular for carrying and/or for guiding and/or for steering and/or for operating the portable implement 200.

So that both a direct guidance of the portable implement 200 and also an intensive vibration damping of the holding element 40 is made possible, the holding element 40 is arranged at a distance from the damping elements 22, 32 between the two connection elements 20, 30. In contrast to the prior art (cf. FIG. 4) the holding element 50 is therefore not integrated into the front connection element 20, but rather is arranged at a distance from the front connection element 20.

The damped guiding unit 100, illustrated in FIGS. 1 to 3, therefore fulfils both requirements, namely a direct guiding behaviour of the portable implement 200 on the one hand, and an intensive uncoupling of the holding element 40 from the motor 250 or from the tool element 220 to achieve an optimum damping on the other hand.

A connecting element or fastening component 50 for connecting the grip element 40 with the guide rod element 10 is therefore mounted at a distance from the damping elements 22, 32 arranged in the connection elements 20, 30, in particular almost centrally (cf. FIGS. 1 to 3), on the vibration damping. Furthermore, the spacing of the damping elements 22, 32 is selected to be significantly greater than according to the prior art (cf. FIG. 4). Thus, the distance of the first damping element 22 to the motor 250 is approximately one third to half of the total length of the guide rod 210 formed from the guide rod element 10, associated with the damped guiding unit 100, and a shaft tube 14. Through the selected distances from the grip element 40 or of the damping elements 22, 32 from each other, a very good guidability is realized, despite soft damping.

According to an advantageous embodiment of the present invention, the distance of the grip element 40 to the damping elements 22, 32 is variable. In this way, an optimum adjustment of the implement 200 and hence a more ergonomic operation is made possible.

To vary the distance of the grip element 40 from the damping elements 22, 32, the connecting element 50 is designed
  in a first position of the connecting element 50 to connect the grip element 40 with the guide rod element 10 displaceably in longitudinal direction to the guide rod element 10 and
  in a second position of the connecting element 50 to fix the grip element 40 releasably on the guide rod element 10, in particular to connect it with the guide rod element 10 in a force-fitting and/or form-fitting manner.

In the first position of the connecting element 50, the grip element 40 can be arranged here for example displaceably on a profile or a groove 12 of the guide rod element 10.

To fix the grip element 40 on the guide rod element 10, the connecting element 50 can for example have at least one clamping element 58, in particular at least one clamping block and/or at least one clamping bush and/or at least one clamping collar.

The two positions of the connecting element 50 can be altered for example by means of at least one operating element 54, in particular at least one screw or at least one lever. In addition, the operating element 54 can be fixed in its second position by means of an arresting—and/or detent element 56.

For fitting a sling strap, by means of which the user can sling the implement 200 around himself, the connecting element 50 advantageously has at least one opening 52a, 52b, 52c, 52d.

Therefore, the damped guiding unit 100, illustrated in FIGS. 1 to 3, is particularly advantageous for use in a hand-operated implement 200, such as for example a trimmer or a brushcutter (cf. FIG. 3), for the ergonomic sawing and/or cutting and/or scything for example of undergrowth and/or of grass.

LIST OF REFERENCE NUMBERS 100 damped guiding unit, in particular holding element damping system, for example grip damper (according to the present invention; cf. FIG. 1 to 3)
10 guide rod element associated with the damped guiding unit 100, in particular damped protective tube element or damped shaft tube element
12 profile or groove of the guide rod element 10 associated with the damped guiding unit 100
14 shaft tube, in particular undamped shaft tube element
20 connection element with damping element 22, in particular first or front connection piece or connection piece facing the tool element 220 or receiving element (according to the present invention; cf. FIG. 1 to 3)
20' connection element (according to the prior art; cf. FIG. 4)
22 receiving element of the damping element, in particular receiving element of the first or front rubber damper, or rubber damper facing the tool element 220 (the first damping element is covered by a covering in FIGS. 1 to 3 and is therefore only indirectly visible)
22' damping element (according to the prior art; cf. FIG. 4)
24 profile of the covering of the first connection element 20, in particular damping covering profile
26 covering, surrounding the shaft tube 14, of the further connection element, in particular damping covering of the guide rod 210
30 further or rear connection element or connection element facing the motor 250, in particular further or rear connection piece or receiving element or connection piece or receiving element facing the motor 250 (according to the present invention; cf. FIG. 1 to 3)
30' further connection element (according to the prior art; cf. FIG. 4)
32 further damping element, in particular rubber damper arranged on the further connection element 30 or elastomer arranged on the further connection element 30
32' further damping element (according to the prior art; cf. FIG. 4)
34 covering coupling flange of the further connection element 30
36 stabilizer of the damping element 32, in particular stabilizer for the further rubber damper
40 holding element, in particular grip and/or handlebar (according to the prior art; cf. FIG. 4)
40' holding element, in particular grip and/or handlebar (according to the prior art; cf. FIG. 4)
42 gas grip of the holding element 40
50 connecting element for connecting the holding element 40 with the guide rod element 10 associated with the damped guiding unit 100
52a first opening of the connecting element 50, in particular facing the motor 250
52b second opening the connecting element 50
52c third opening of the connecting element 50
52d fourth opening of the connecting element 50, in particular facing the tool element 220
52e fifth opening of the connecting element 50, in particular facing the tool element 220

54 operating element, in particular lever or screw, of the connecting element 50
56 arresting—and/or detent element of the connecting element 50
58 clamping connection, in particular clamping block and/or clamping bush and/or clamping collar, of the connecting element 50
200 portable implement, in particular hand-operated implement, for example trimmer or brushcutter
210 guide rod with guide rod element 10 and shaft tube 14, in particular with damped guide rod element 10 and undamped shaft tube element 14
220 tool element, in particular operating head
250 motor, in particular combustion motor

The invention claimed is:

1. A damped guiding unit for a portable implement, comprising:
   at least one connection element arranged at one end of a guide rod element, for the direct or indirect connection of a tool element for the sawing, cutting or scything of undergrowth or grass;
   at least one damping element arranged on the connection element, for the damping of oscillations or vibrations caused by the tool element; and
   at least one holding element, comprising a grip element, arranged on the guide rod element, for holding, carrying, guiding, steering or operating the portable implement;
   characterized in that
   the holding element and the connection element are structural elements which are respectively separated from each other, wherein the holding element is associated with a first assembly comprising the holding element and at least one fastening component for fastening the holding element to the guide rod element and the connection element is associated with a further assembly separated from the first assembly, the further assembly comprising the connection element and the at least one clamping element; and
   the holding element is arranged at a distance from the connection element between the one end and the other end of the guide rod element.

2. A damped guiding unit according to claim 1, characterized in that the distance from the centre of the holding element to the centre of the damping element is more than 40 millimeters (mm).

3. A damped guiding unit according to claim 2, characterized in that the distance from the centre of the holding element to the centre of the damping element is between approximately 70 mm and approximately 300 mm.

4. A damped guiding unit according to claim 1, characterized in that the holding element is arranged substantially centrally between the two ends of the guide rod element.

5. A damped guiding unit according to claim 1, characterized by at least one further connection element arranged at the other end of the guide rod element, for the direct or indirect connection of a motor for driving the tool element.

6. A damped guide unit according to claim 5, characterized by at least one further damping element arranged on the further connection element, for the damping of oscillations or vibrations caused by the motor.

7. A damped guiding unit according to claim 1, wherein the distance of the holding element to the damping element is variable by adjustment of the fastening component, such that when the fastening component is in a first position the holding element is adjustably connected to the guide rod element and displaceable in a longitudinal direction relative to the guide rod element, and when the fastening component is in a second position the holding element is releasably fixed to the guide rod element in a force-fitting or form-fitting manner.

8. A portable implement comprising:
   at least one tool element arranged at one end of a guide rod, for the sawing, cutting, or scything of undergrowth or grass; and
   at least one motor, arranged at the other end of the guide rod, for driving the tool element;
   characterized by
   at least one damped guiding unit, arranged between the tool element and the motor, according to claim 1.

9. A portable implement according to claim 8, characterized in that the guide rod element is associated with the guide rod, and is arranged such that the one end of the guide rod element faces the tool element and the other end of the guide rod element faces the motor.

10. A portable implement according to claim 8, characterized in that the at least one damping element is arranged at a distance from the motor and from a further damping element associated with the motor, wherein the distance of the at least one damping element from the motor and from the further damping element is approximately one third to approximately half of the total length of the guide rod.

11. A method for producing a damped guiding unit for the damping of oscillations or vibrations in a holding element on a portable implement, comprising the steps of:
   assembling a first assembly comprising the holding element;
   assembling a second assembly comprising a connection element and a damping element;
   attaching the second assembly to one end of a guide rod element, such that the connection element is attached to the guide rod element;
   connecting a tool element directly or indirectly to the connection element, the tool element for the sawing, cutting or scything of undergrowth or grass;
   disposing the damping element between the connection element and the tool element for the damping of oscillations or vibrations caused by the tool element; and
   attaching the first assembly to the guide rod element in spaced relation to the second assembly;
   arranging the holding element a distance from the connection element between the one end of the guide rod element and the other end of the guide rod element.

12. A method according to claim 11, characterized in that the centre of the holding element is arranged at a distance of at least 40 millimeters (mm) from the centre of the damping element and substantially centrally between the one end and the other end of the guide rod element.

13. A method according to claim 12, characterized in that the centre of the holding element is arranged at a distance of approximately 70 mm to approximately 300 mm from the centre of the damping element.

14. A method according to claim 11, characterized in that the first assembly is displaceably attached to the guide rod element, such that the distance of the holding element from the damping element is variable.

15. A method according to claim 14, characterized in that the first assembly is displaceably attached to the guide rod element, wherein in a first attached position the holding element is displaceable in a longitudinal direction relative to the guide rod element, and in a second attached position the holding element is releasably fixed to the guide rod element in a force-fitting or form-fitting manner.

* * * * *